2,935,476
Patented May 3, 1960

2,935,476
CARBON DEPOSIT REDUCTION

Archibald P. Stuart, Media, Pa., assignor to Sun Oil Company, Philadelphia, Pa., a corporation of New Jersey No Drawing. Application September 30, 1957
Serial No. 686,837

5 Claims. (Cl. 252—18)

This invention relates to reducing the quantity of carbonaceous deposits in the combustion chambers of internal combustion engines.

Internal combustion engines accumulate deposits on combustion chamber surfaces during normal engine operation. These deposits are deleterious because they increase engine wear and cause engine overheating. Also, in spark ignition engines, the combustion chamber deposits promote preignition and engine knocking thereby causing higher octane fuel requirements. The combustion chamber deposits are derived largely from decomposition of the fuel and/or lubricant used in the engine, although material derived from the decomposition of various fuel or lubricant additives such as anti-knock agents, detergents, extreme pressure agents, and the like may also be contained in the deposits.

In view of the deleterious effects of combustion chamber deposits, it is important and desirable to provide means whereby the deposited material can be removed from the combustion chambers of internal combustion engines.

In accordance with the present invention, the quantity of deposited material in the combustion chambers of an internal combustion engine is reduced by continuously introducing barium peroxide or strontium peroxide, or mixtures thereof, into these combustion chambers as fuel and/or lubricant additives during normal engine operation.

It has heretofore been proposed to introduce aqueous solutions of hydrogen peroxide into the combustion chambers of internal combustion engines to remove deposit accumulations and to suppress further deposition. The aqueous solution of hydrogen peroxide is intermittently or continuously introduced through the intake manifold of the engine. Such methods have been only partially successful. One disadvantage is that auxiliary equipment is required for the storage and handling of the solution. Another disadvantage of more serious import is that the water accompanying the hydrogen peroxide contributes to the corrosion of engine parts. A further disadvantage, and the most important one is that hydrogen peroxide is volatile and highly unstable and hence probably decomposes almost immediately under combustion chamber conditions to water and oxygen without becoming effectively incorporated in the combustion chamber deposits. The water formed by such decomposition contributes further to metal corrosion as above described. Also, when intermittent addition is practiced, the operation of the engine is seriously affected, abnormal operation being required until the treatment is concluded.

The present invention is contrary to previous practice in that highly stable, nonvolatile barium or strontium peroxide, or a mixture thereof, is incorporated, in minor amounts, in internal combustion engine fuels and lubricants and is thus introduced continuously to engine combustion chambers during normal operation of the engine. Barium and strontium peroxide, being highly stable and nonvolatile, do not decompose as rapidly as hydrogen peroxide under combustion chamber conditions, but become incorporated in deposit accumulations where gradual decomposition takes place with the evolution of oxygen. In contradistinction to aqueous hydrogen peroxide solutions, no water is introduced and none is formed upon decomposition of the metal peroxide per se, thus eliminating this water as a source of corrosion. Furthermore, the operation of the engine is not affected by the practice of this invention, the engine operation being at all times wholly normal.

At combustion chamber conditions, the gradual decomposition of the barium and/or strontium peroxide which has become incorporated in the deposit accumulations is thought to loosen and dislodge the deposits. The quantity of combustion chamber deposits, including the noncarbonaceous inorganic material resulting from decomposition of fuel and/or lubricant additives, is thereby reduced. The quantity of carbonaceous deposits is also reduced in this way, but even further by the more complete combustion of this material which is promoted by the oxygen gradually evolved during decomposition of the metal peroxide.

Because of their favorable properties, barium peroxide and strontium peroxide are the only metal peroxides which are now known to be suitable for the practice of this invention. Of these two, barium peroxide has the most favorable properties and is preferred.

Both spark ignition and compression ignition engines are advantageously treated in accordance with the present invention since carbonaceous deposits are deleterious in both type engines. The problems caused by carbonaceous combustion chamber deposits are more severe in spark ignition engines, and for this reason these engines are more advantageously treated according to the invention.

In practice of one embodiment of the invention, barium peroxide or strontium peroxide or a mixture of the two is incorporated in the fuel which is used in the engine to be treated. The fuel to which the additives of the invention are added is a mixture of petroleum hydrocarbons boiling in the gasoline or diesel fuel range. i.e., in the range of from about 90° F. to about 750° F. Gasoline hydrocarbons generally boil in the range of from about 80° F. to about 440° F., and more normally in the range of from about 90° F. to about 400° F. at atmospheric pressure. Diesel fuel hydrocarbons generally have atmospheric boiling ranges of from about 400° F. to about 750° F., but in certain cases may exhibit initial boiling points as low as about 300° F. or final boiling points as high as about 800° F. For successful practice, it is necessary that the metal peroxide be added in amount sufficient to reduce carbonaceous combustion chamber deposits during subsequent use of the fuel in the engine. Generally, use of metal peroxide in amount of about 0.05% to 5% by weight of the fuel and more preferably 0.1% to 2% is suitable. However, on occasion amounts outside this range can be used.

The barium or strontium peroxide can be incorporated in the hydrocarbon fuel with the aid of surfactants or dispersing agents such as alkyl or aryl sulfonates, or the like. Alternatively, the metal peroxide can be reduced in average particle size to a diameter whereby it will remain in colloidal dispersion in the hydrocarbon fuel, e.g., about 10 microns or less. If desirable, a combination of these dispersing procedures can be used.

The fuel in which the metal peroxide is incorporated can also contain other fuel additives which are known in the art. For example, in addition to the additives of the invention, the fuel can contain an anti-knock additive such as tetra ethyl lead, iron carbonyl, or bis-cyclopentadienyl iron with scavengers therefor, or other additives such as anti-icing agents, anti-rusting agents, etc.

In a second embodiment of the invention, barium peroxide or strontium peroxide or a mixture of the two is incorporated in an internal combustion engine lubricant in amount sufficient to reduce the amount of carbonaceous combustion chamber deposits during subsequent use of the lubricant in a spark ignition or compression ignition engine. Generally, amounts of the additive in the range of about 0.05% to 5% by weight of the lubricant and preferably about 0.1% to 2% are suitable. However, amounts outside this range can on occasion successfully be used.

The lubricants used in this embodiment of the invention are conventional internal combustion engine lubricants, i.e., viscous petroleum hydrocarbon mixtures boiling in the range of about 600° F. to about 1000° F. at atmospheric pressure. These lubricants are commonly referred to as motor oils. The barium or strontium peroxide can be dispersed in the lubricant in suitable amounts with the aid of agents such as barium or strontium mahogany sulfonate which form oil-soluble complexes with the metal peroxides; these compositions have the dual advantages of high detergency as well as carbon deposit reducing properties. Other dispersing agents can be used. Alternatively, the particle size of the metal peroxide can be reduced to about 10 microns or lower so that the peroxide forms a colloidal suspension in the lubricant. Other means for incorporating the metal peroxide in lubricant which will be apparent to those skilled in the art can be used.

In addition to the additives of this invention, the lubricant can also contain other additives such as extreme pressure agents, anti-oxidant additives, and the like. The use of detergent additives such as barium or strontium mahogany sulfonates is especially preferred since these detergent additives facilitate incorporation of the metal peroxide additives in the lubricant as described above.

In accordance with the above-described embodiments, the fuel or lubricant compositions of the invention are used in internal combustion engines. During normal operation of the engine, barium peroxide or strontium peroxide is introduced into the engine combustion chambers and becomes incorporated in deposits therein. In this manner the quantity of carbonaceous combustion chamber deposits are reduced.

In order to illustrate a specific embodiment of the invention, finely divided solid barium peroxide is colloidally dispersed in a commercially available leaded gasoline in an amount equal to 0.5% by weight of the resulting composition. This novel fuel composition is then used in a spark ignition internal combustion engine and a substantial reduction in the quantity of combustion chamber deposits is observed when compared with engine operation on the same gasoline but without the additive of the invention.

In another specific embodiment, barium peroxide is dissolved in a commercially available, viscous petroleum hydrocarbon internal combustion engine lubricant containing, as a detergent additive, a minor amount of barium mahogany sulfonates. The barium peroxide is incorporated in the oil in an amount equivalent to 2.0% by weight of the resulting composition. Solution of the barium peroxide in the lubricating oil is effected by the presence of the barium mahogany sulfonates which form an oil-soluble complex with the peroxide. When this novel lubricant composition is used in a spark ignition internal combustion engine, a reduction in the quantity of combustion chamber deposits is observed when compared with engine operation using the same lubricant but without the additive of the invention.

This application is a continuation-in-part of patent application, Serial Number 512,563, filed June 1, 1955, and now abandoned.

I claim:

1. Spark ignition internal combustion engine fuel composition comprising: a major proportion of gasoline and a minor amount, sufficient to reduce the quantity of carbonaceous combustion chamber deposits, of a material selected from the group consisting of barium peroxide, strontium peroxide and mixtures thereof.

2. Compression ignition internal combustion engine fuel composition comprising: a major proportion of diesel fuel and a minor amount, sufficient to reduce the quantity of carbonaceous combustion chamber deposits, of a material selected from the group consisting of barium peroxide, strontium peroxide and mixtures thereof.

3. Internal combustion engine lubricant composition comprising: a major proportion of a viscous petroleum hydrocarbon internal combustion engine lubricant and a minor amount, sufficient to reduce the quantity of carbonaceous combustion chamber deposits, of a material selected from the group consisting of barium peroxide, strontium peroxide and mixtures thereof.

4. Internal combustion engine lubricant composition comprising: a major proportion of a viscous petroleum hydrocarbon internal combustion engine lubricant, a minor amount of a detergent selected from the group consisting of barium mahogany sulfonates and strontium mahogany sulfonates, and a minor amount, sufficient to reduce the quantity of carbonaceous combustion chamber deposits, of a material selected from the group consisting of barium peroxide, strontium peroxide and mixtures thereof.

5. Composition for use in internal combustion engines, and effective for reducing the quantity of carbonaceous combustion chamber deposits therein, said composition comprising a major amount of a petroleum hydrocarbon fraction selected from the group consisting of gasoline, diesel fuel and viscous petroleum hydrocarbon internal combustion engine lubricant, and a minor amount, sufficient to reduce the quantity of carbonaceous combustion chamber deposits, of a material selected from the group consisting of barium peroxide, strontium peroxide and mixtures thereof.

References Cited in the file of this patent

UNITED STATES PATENTS

| 929,503 | Selden | July 27, 1909 |
| 2,485,861 | Campbell et al. | Oct. 25, 1949 |
| 2,696,806 | Mingle | Dec. 14, 1954 |

FOREIGN PATENTS

| 157,028 | Australia | June 11, 1954 |